(12) United States Patent  
Kotaka

(10) Patent No.: US 6,629,258 B1  
(45) Date of Patent: Sep. 30, 2003

(54) VARIABLE SPEED DATA ACCESS CONTROL CIRCUIT WITH EXPONENTIAL LENGTH WAIT CYCLE

(75) Inventor: Mikihiko Kotaka, Tokyo (JP)

(73) Assignee: Oki Electric Industry Co, Ltd., Tokyo (JP)

( * ) Notice: Subject to any disclaimer, the term of this patent is extended or adjusted under 35 U.S.C. 154(b) by 0 days.

(21) Appl. No.: 09/534,637

(22) Filed: Mar. 27, 2000

(30) Foreign Application Priority Data

Oct. 22, 1999 (JP) .......................................... 11-300730

(51) Int. Cl.$^7$ ................................................. G06F 5/06
(52) U.S. Cl. ...................................................... 713/600
(58) Field of Search ................................... 713/500, 600

(56) References Cited

U.S. PATENT DOCUMENTS

| | | | | | |
|---|---|---|---|---|---|
| 4,488,229 A | * | 12/1984 | Harrison | ...................... | 326/40 |
| 4,754,399 A | * | 6/1988 | Yamamoto et al. | ............. | 710/57 |
| 4,807,112 A | * | 2/1989 | Hamasaki | ..................... | 710/59 |
| 5,548,787 A | * | 8/1996 | Okamura | ..................... | 710/25 |
| 5,706,438 A | * | 1/1998 | Choi et al. | ..................... | 710/71 |
| 5,717,872 A | * | 2/1998 | Whittaker | .................... | 710/105 |
| 5,905,711 A | * | 5/1999 | Chiussi et al. | .............. | 370/232 |
| 6,075,769 A | * | 6/2000 | Ghanwani et al. | .......... | 370/229 |
| 6,161,189 A | * | 12/2000 | Arimilli et al. | ............. | 713/600 |

FOREIGN PATENT DOCUMENTS

JP  06139184 A  *  5/1994  ........... G06F/13/16

* cited by examiner

*Primary Examiner*—Thomas Lee  
*Assistant Examiner*—Eric Chang  
(74) *Attorney, Agent, or Firm*—Rabin & Berdo, P.C.

(57) ABSTRACT

An access control unit provided in an LSI, that supports external devices with varying access times, comprises a clock, mask circuit, a wait signal generating circuit, a flip-flop and a wait cycle number setting register. The wait signal generating circuit calculates the number of wait cycles using a formula for determining a general term in an geometrical progression based upon the data currently set at the wait cycle setting register to generate and output a wait signal "wait." The clock signal "clock" is input to another input terminal of the clock mask circuit. The flip-flop takes in data output by a low-speed external device or a high-speed external device in synchronization with the clock signal "clock" and provides the data thus taken in to a CPU with specific timing.

10 Claims, 3 Drawing Sheets

VARIABLE SPEED DATA ACCESS CONTROL CIRCUIT WITH EXPONENTIAL LENGTH WAIT CYCLE

BACKGROUND OF THE INVENTION

1. Field of the Invention

The present invention relates to an integrated circuit and an access control method, and in more specific terms, it relates to an integrated circuit having an access control unit that controls access to an external device and an access control method employed therein.

2. Description of the Related Art

An external device connected to a semiconductor integrated circuit (hereafter referred to as an "LSI") has an access time which is inherent to the particular device. The access time in this context refers to the length of time that elapses until access to the external device is enabled, and the LSI waits for the access time to elapse and then accesses the external device.

Under normal circumstances, an LSI connected to an external device is provided with an access control unit that controls access to the external device by setting a wait (standby) time to elapse until the external device access time is up. This access control unit is provided with a wait cycle number setting register and a wait signal generating circuit that determines the actual number of wait cycles based upon data set at the wait cycle number setting register. It is to be noted that the number of wait cycles corresponds to the number of clocks in a clock signal at the LSI, and the wait time is determined as the product of the number of wait cycles and a clock signal cycle.

The wait signal generating circuit provided in an LSI in the prior art calculates the number of wait cycles $\alpha_n$ by using a formula for determining a general term $\alpha_n$ in an arithmetic progression:

$$\alpha_n = a + (n-1)d \qquad \text{(formula 1)}$$

In the formula above, n represents a value corresponding to the data set at the wait cycle number setting register, and the explanation, is given here on the assumption that n=1 when the data set at the wait cycle number setting register indicate "0" with n increasing by 1 each time the number of sets of data increases by 1.

For instance, when; a (initial term)=1 and d (common difference)=1 in (formula 1) and data indicating "0" are set (n=1) at the wait cycle number setting register, as illustrated in FIG. 3, the number of wait cycles $\alpha_n$ is determined to be $\alpha_n=1$ by the wait signal generating circuit. Then, as the number of sets of data set at the wait cycle number setting register increases, the number of wait cycles $\alpha n$ is obtained as (2, 3, . . . , $2^W-2$, $2^W-1$, $2^W$). It is to be noted that W indicates the bit width at the wait cycle number setting register.

There are many different types of external devices connected to LSIs and they have become even more diverse in recent years. In addition, a single LSI may be connected with a plurality of external devices with varying access times, including an external device with a short access time and an external device with a long access time. For this reason, LSI need to be capable of supporting varying access times.

SUMMARY OF THE INVENTION

However, the number of wait cycles set at the access control unit provided in the LSI in the prior art constitutes an arithmetic progression as explained above and, as a result, it is necessary to allow a large bit width at the wait cycle number setting register to increase the number of wait cycles.

For instance, when the LSI clock frequency is 100 MHz (cycle 10 ns), a plurality of external devices are connected to the LSI and their access times are all within a range of 10 ns~1 μs, the maximum of 100 levels (10, 20, 30 . . . 980, 990 ns 1 μs) of wait time can be set. However, the wait cycle number setting register is required to have a bit width of 7 bits to support these wait time setting levels. The circuit scale of the LSI is bound to become large to support a larger bit width at the wait cycle number setting register, which, in turn, leads to an increase in the production costs.

An object of the present invention, which has been completed by addressing the problem of the prior art discussed above is to provide an integrated circuit and an access control method, that support external devices with varying access times without having to increase the circuit scale.

In order to achieve the object described above, in a first aspect of the present invention, an integrated circuit having an access control unit that controls access to an external device is provided. The access control unit comprises a register at which n types of data, i.e., a first set of data through an nth set of data, can be set, a wait signal generating circuit that calculates the number of wait cycles $a \cdot r^{k-1}$ (a and k are integers) to output a wait signal over the length of time corresponding to the number of wait cycles $a \cdot r^{k-1}$ calculated when the data set at the register is a kth set of data ($1 \leq k \leq n$) and an interface unit that is connected with the external device and is forbidden to access the external device while the wait signal is output by the wait signal generating circuit.

Since the wait signal generating circuit calculates the number of wait cycles based upon the data set at the register and the formula for determining a general term in an arithmetic progression, a plurality of wait cycle numbers calculated by the wait signal generating circuit constitute the arithmetic progression. In other words, when the value indicated by the data set at the register increases by one, the number of wait cycles increases exponentially. Thus, even when the register bit width is small, the maximum value for the number of wait cycles that can be set is increased.

In a second aspect of the present invention, the interface unit includes a clock mask circuit and a flip-flop. It is desirable that the clock mask circuit be provided with a first input terminal to which the wait signal is input, a second input terminal to which a clock signal is input and an output terminal that is fixed at a specific logic level when the wait signal is being input to the first input terminal but is engaged to output the clock signal input to the second input terminal when the wait signal is not being input to the first input terminal. In addition, the flip-flop should preferably be capable of taking in external data from the external device in synchronization with a clock signal output via the output terminal of the clock mask circuit.

By adopting this structure, in which the clock mask circuit can be constituted by employing a simple logic gate such as an OR gate, a clock signal to be provided to the flip-flop can be effectively cut off by the wait signal. As a result, since the flip-flop cannot take in the external data output by the external device unless a clock signal is input therein, the wait signal is ultimately used to prohibit/allow access between the integrated circuit and the external device.

In a third aspect of the present invention, a method of controlling access between an integrated circuit and an external device connected to the integrated circuit is provided. This access control method comprises a step in which a kth set of data (1≦k ≦n, k is an integer) is set at a register at which n types of data, i.e., a first set of data through an nth set of data can be set, a step in which the number of wait cycles a·r^{k-1} (a is an integer) is calculated, a step in which a wait signal is set in an active state over a length of time corresponding to the number of wait cycles a·r^{k-1} and a step in which access to the external device is prohibited while the wait signal remains in an active state.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate a preferred embodiment. In the drawings.

DETAILED DESCRIPTION OF THE PREFERRED EMBODIMENT

The following is a detailed explanation of a preferred embodiment of the integrated circuit and the access control method according to the present invention, given in reference to the attached drawings. It is to be noted that in the following explanation and the attached drawings the same reference numbers are assigned to components having functions and structural features identical to one another to preclude the necessity for repeated explanation thereof.

Figure 1:
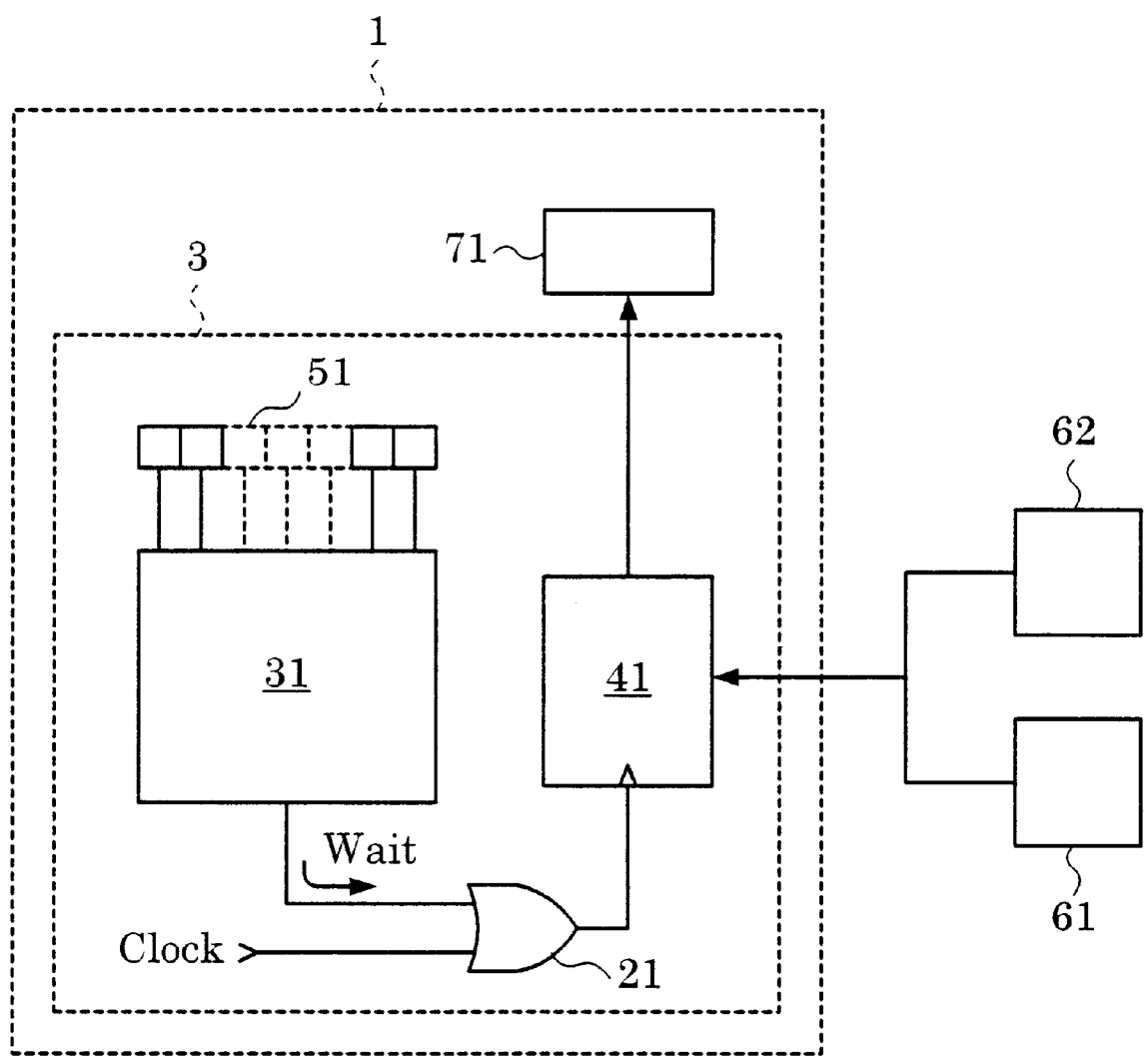
FIG. 1 is a block diagram illustrating the structure of the LSI in an embodiment of the present invention.

FIG. 1 is a block diagram illustrating the structure of an LSI 1 in the embodiment of the present invention and in particular, the structure of its access control unit 3. In addition, FIG. 1 shows a low-speed external device 61 and a high-speed external device 62 connected in parallel to the LSI 1.

The access control unit 3 comprises a clock mask circuit 21, a wait signal generating circuit 31, a flipflop 41 and a wait cycle number setting register 51. The wait signal generating circuit 31 executes a specific arithmetic operation based upon the data set at the wait cycle number setting register 51 and provides a wait signal "wait" thus obtained to one of the input terminals of the clock mask circuit 21 constituted of an OR gate. The clock signal "clock" is input to the other input terminal of the clock mask circuit 21.

The output terminal of the clock mask circuit 21 is connected to a clock input terminal of the flipflop 41. The flipflop 41 takes in data output by either the low-speed external device 61 or the high-speed external device 62 in synchronization with the clock signal "clock" and provides the data thus taken in to a CPU 71 with specific timing. The data output terminals of the low-speed external device 61 and the high-speed external device 62 are commonly connected with a data input terminal of the flipflop 41.

The operation achieved in the LSI 1 in the embodiment of the present invention structured as described above is now explained.

At the access control unit 3 provided in the LSI 1, the wait signal generating circuit 31 provides the wait signal "wait" set to H level to one of the input terminals of the clock mask set circuit 21 over a specific period of time based upon the data currently set at the wait cycle number setting register 51. While the wait signal "wait" at H level is being input therein, the clock mask circuit 21 fixes the clock input terminal of the flipflop 41 to H level even if the clock signal "clock" is being input to the other input terminal thereof. Thus, during this period of time, the no data from either the low-speed external device 61 or the high-speed external device 62 are taken into the flipflop 41. In other words, by adjusting the length of time over which the wait signal "wait" (H level) from the wait signal generating circuit 31 is output, the wait time that corresponds to the access time of the low-speed external device 61 and the high-speed external device 62 is set.

At the access control unit 3, the length of time over which the wait signal from the wait signal generating circuit 31 is output is determined as follows.

The wait signal generating circuit 31 calculates the number of wait cycles $\alpha_n$ by using a formula for calculating a general term $\alpha_n$ in an arithmetic progression;

$$a_n = a \cdot r^{n-1} \qquad \text{(formula 2)}$$

In the formula above, n represents a value corresponding to the data set at the wait cycle number setting register 51, and the explanation proceeds on the assumption that n=1 when the data set at the wait cycle number setting register 51 indicate "0" with n increasing by one each time the data value increases by one.

Figure 2:
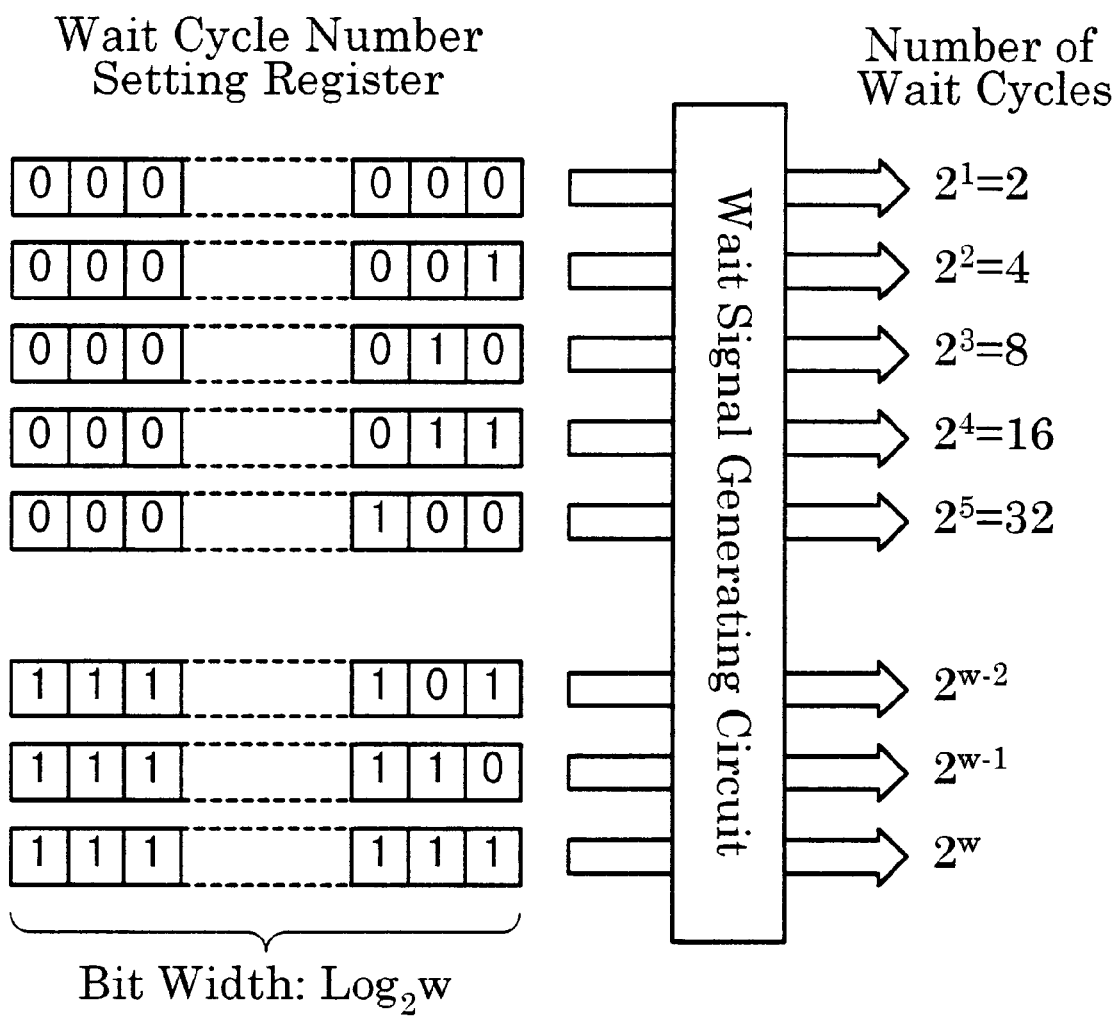
FIG. 2 illustrates the operation achieved in the LSI in FIG. 1.

For instance, when a (initial term)=2 and r (common ratio)=2 in (formula 2) and data indicating "0" are set (n=1) at the wait cycle number setting register 51, as illustrated in FIG. 2, the number of wait cycles an is determined to be $\alpha_n$=2 by the wait signal generating circuit 31. Then, as the value indicated by the data set at the wait cycle number setting register 51 increases, the number of wait cycles $\alpha_n$ is obtained as (4, 8, ..., $2^{w-2}$, $2^{w-1}$, $2^w$). It is to be noted that $\log_2 w$ indicates the bit width at the wait cycle number setting register 51.

When a=2 and r=2 in (formula 2) and the data set at the wait cycle number setting register 51 indicate "3" (decimal number) (n=4), the number of wait cycles is calculated to be "16" by the wait signal generating circuit 31. The number of wait cycles corresponds to the number of clocks in the clock signal "clock" input to the clock mask circuit 21, and a clock signal generating circuit 31 outputs a wait signal "wait" set to H level for a length of time corresponding to this number of clocks.

For instance, if the access time of the low-speed external device 61 is 1μs and the frequency of the clock signal "clock" is 10 MHz (cycle; 100 μs), the number of wait cycles must be 10 (=1μs/100 μs) or larger. Data with which the number of wait cycles of at least 10 is obtained are set at the wait cycle number setting register 51, and the wait signal generating circuit 31 outputs the wait signal "wait" over a length of time corresponding to the data.

In contrast, if the frequency of a clock signal "clock" is 100 MHz (cycle;10 ns) the number of wait cycles must be 10 times as many, i.e., 100(=1 μs/10 ns) or greater, in correspondence to the same access time of the low-speed external device 61, i.e., 1 μs.

The wait cycle number setting register 51 only needs to have a bit width of 3 bits to assure the number of wait cycles of 100 or more at the access control unit 3 provided in the LSI 1 in the embodiment of present invention, since; $2^7$=128 $\log_2 7 \leq 3$ (bit width), as clearly indicated in FIG. 2

Figure 3:
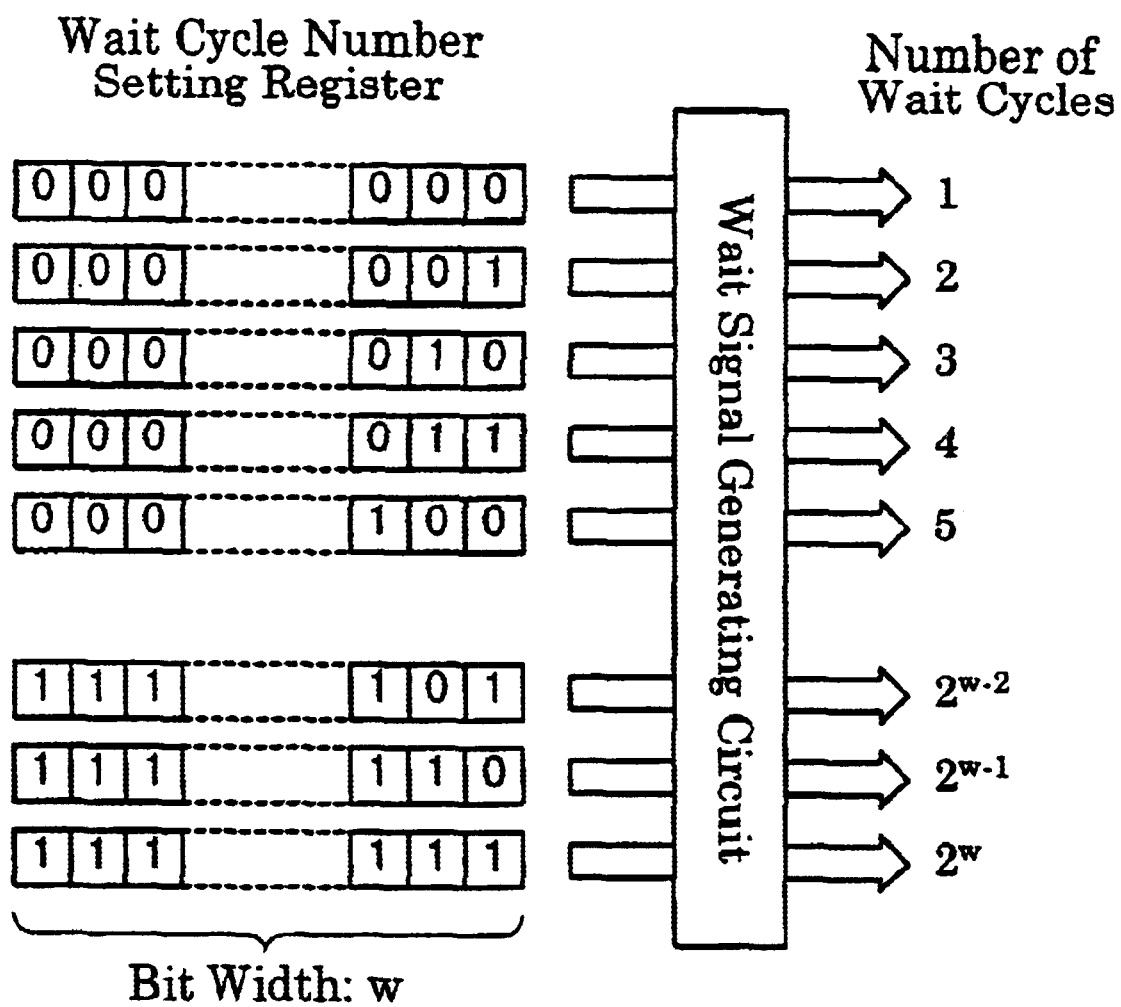
FIG. 3 illustrates the operation of an LSI in the prior art.

As explained earlier, FIG. 3 shows the number of wait cycles (1, 2, 3, 4, ... ,) generated by the wait signal generating circuit in the prior art. While these values representing the number of wait cycles are calculated with a (initial term)=1 and d (common difference)=1 through (formula 1), the number of wait cycles (2, 4, 6, 8, . . .) may be calculated with a=2 and d=2 or the number of wait cycles (1, 3, 5, 7, . . .) may be calculated with a=1 and d=2 instead. However, in either case, the bit width at the wait cycle number setting register is bound to be extremely large if the number of wait cycles required is 100 or more. For instance, a bit width of "7" is required in the pattern shown in FIG. 3. As a result, the wait cycle number setting register must have a bit width that is more than twice as large as that required at the access control unit 3 provided in the LSI 1 in the embodiment of the present invention which is capable of supporting 256 wait cycles at the bit width of 3 bits.

It is to be noted that by setting d (common difference) to a larger value in (formula 1) used in the prior art, the maximum value for the number of wait cycles can be increased for a wait cycle number setting register having a small bit width. However, if d is set at a large value, an undesirable situation may occur in which a high-speed external device with a short access time is connected but access is started only when a length of time greatly exceeding the access time has elapsed. Since the need for achieving real time operability is greater in a high-speed external device compared to a low-speed external device, the access control unit should be capable of allowing a number of wait cycles (wait times) to be set that is appropriate for the access time of the connected high-speed external device. In this respect, the access control unit 3 provided in the LSI 1 in the embodiment of the present invention, which allows a larger maximum value for the number of wait cycles to be taken even when the bit width at the wait cycle number setting register 51 is small and allows the number of wait cycles to be set in fine increments in the range over which the number of wait cycles is small, achieves access to a high-speed external device with real time operability.

In addition, by adopting the LSI 1 in the embodiment of the present invention which allows the bit width at the wait cycle number setting register 51 to be small, the circuit scale of the access control unit 3 is reduced to achieve a more compact LSI 1 and an improvement in the product yield. Furthermore, since the number of wait cycles generated is reduced, the length of time required for testing the LSI 1 prior to product shipment can be shortened as well.

While the invention has been particularly shown and described with respect to a preferred embodiment thereof by referring to the attached drawings, the present invention is not limited to this example and it will be understood by those skilled in the art that various changes in form and detail may be made therein without departing from the spirit, scope and teaching of the invention.

While the explanation is given above in reference to the embodiment of the present invention on an example in which a (initial term) is 2 and r (common ratio) is 2 in (formula 2), the present invention is not restricted by these values in any way whatsoever, As have been explained, according to the present invention, a larger maximum value can be achieved for the number of wait cycles without having to increase the circuit scale.

The entire disclosure of Japanese Patent Application No. 11-300730 filed on Oct. 22, 1999 including specification, claims, drawings and summary is incorporated herein by reference in its entirety.

What is claimed is:

1. An integrated circuit having an access control unit for controlling access to an external device, said access control unit comprising:

a register that allows n data values, from a first data value to an nth data value, to be set therein;

a wait signal generating circuit that calculates a number of wait cycles $a_k = a \cdot r^{k-1}$, and generates and outputs a wait signal over a length of time corresponding to the calculated number of wait cycles $a_k$, wherein a and k are integers and k is a kth data value set at said register such that $1 \leq k \leq n$; and an interface unit that is connected with said external device and is not allowed to access said external device over the length of time during which said wait signal is output by said wait signal generating circuit.

2. An integrated circuit according claim 1, wherein said interface unit includes:

a clock mask circuit having a first input terminal to which said wait signal is input, a second input terminal to which a clock signal is input and an output terminal that is set to a specific logic level while said wait signal is input to said first input terminal, and output said inputted clock signal when said wait signal is not input to said first input terminal; and a flip-flop that takes in external data from said external device in synchronization with said clock signal output from said output terminal of said clock mask circuit.

3. An integrated circuit according claim 2, wherein said clock mask circuit is comprised of an OR gate.

4. An integrated circuit according to claim 1, wherein in calculating the number of wait cycles, $a_k$, a is set to 2 and r is set to 2.

5. An integrated circuit according to claim 1, wherein said wait signal generating circuit outputs said wait signal over a length of time determined by multiplying the number of wait cycles, $a_k$, by the cycle time of said clock signal.

6. An integrated circuit according to claim 1, wherein data stored in said register are set in correspondence to the access time of said external device.

7. A method of controlling access between an integrated circuit and an external device connected to said integrated circuit, comprising the steps of:

setting a kth data value at a register that allows n data value, from a first data value through an nth data value, to be set therein, k being an integer such that $1 \leq k \leq n$;

calculating a number of wait cycles $a_k = a \cdot r^{k-1}$ wherein a is an integer;

setting a wait signal in an active state over a length of time corresponding to the number of wait cycles, $a_k$; and disallowing access to said external device while said wait signal remains in said active state.

8. An access control method according to claim 7, wherein in calculating the number of wait cycles, $a_k$, a is set to 2 and r is set to 2.

9. An access control method according to claim 7, wherein said wait signal remains in an active state over a length of time determined by multiplying the number of wait cycles, $a_k$, by the cycle time of said clock signal.

10. An access control method according to claim 7, wherein data stored in said register are set in correspondence to the access time of said external device.

* * * * *